(12) United States Patent
Spencer, Jr.

(10) Patent No.: US 7,069,267 B2
(45) Date of Patent: Jun. 27, 2006

(54) DATA STORAGE AND ACCESS EMPLOYING CLUSTERING

(75) Inventor: Herman Spencer, Jr., Las Vegas, NV (US)

(73) Assignee: Tririga LLC, Las Vegas, NV (US)

(*) Notice: Subject to any disclaimer, the term of this patent is extended or adjusted under 35 U.S.C. 154(b) by 461 days.

(21) Appl. No.: 10/094,361

(22) Filed: Mar. 8, 2002

(65) Prior Publication Data

US 2002/0188610 A1   Dec. 12, 2002

Related U.S. Application Data (60) Provisional application No. 60/274,302, filed on Mar. 8, 2001.

(51) Int. Cl.
  *G06F 17/30* (2006.01)
  *G06F 7/00* (2006.01)

(52) U.S. Cl. .......................... 707/10; 709/227

(58) Field of Classification Search .................. 707/10; 709/227
  See application file for complete search history.

(56) References Cited

U.S. PATENT DOCUMENTS

| | | | |
|---|---|---|---|
| 4,700,318 A | 10/1987 | Ockman | |
| 4,799,156 A | 1/1989 | Shavit et al. | |
| 4,870,576 A | 9/1989 | Tornetta | |
| 4,972,318 A | 11/1990 | Brown et al. | |
| 4,992,940 A | 2/1991 | Dworkin | |
| 5,189,606 A | 2/1993 | Burns et al. | |
| 5,303,144 A | 4/1994 | Kawashima et al. | |
| 5,428,782 A * | 6/1995 | White ......................... | 718/101 |
| 5,526,520 A | 6/1996 | Krause | |
| 5,528,490 A | 6/1996 | Hill | |
| 5,557,775 A * | 9/1996 | Shedletsky .................... | 703/13 |
| 5,655,118 A | 8/1997 | Heindel et al. | |
| 5,666,493 A | 9/1997 | Wojcik et al. | |
| 5,668,736 A | 9/1997 | Douglas et al. | |
| 5,689,705 A | 11/1997 | Fino et al. | |
| 5,694,551 A | 12/1997 | Doyle et al. | |
| 5,710,887 A | 1/1998 | Chelliah et al. | |
| 5,715,314 A | 2/1998 | Payne et al. | |
| 5,727,950 A * | 3/1998 | Cook et al. .................. | 434/350 |
| 5,742,931 A | 4/1998 | Spiegelhoff et al. | |
| 5,754,850 A | 5/1998 | Janssen | |

(Continued)

FOREIGN PATENT DOCUMENTS

EP    0 959 421 A    11/1999

(Continued)

OTHER PUBLICATIONS

Bayeh, "The WebSphere Application Server Architecture and Programming Model," IBM Systems Journal, vol. 37, No. 3, 1998, pp. 336-348.

(Continued)

*Primary Examiner*—Wayne Amsbury
(74) *Attorney, Agent, or Firm*—Vierra Magen Marcus & DeNiro LLP (57) ABSTRACT

A data management system operable between a set of presentation layer servers, a set of application servers and a set of data servers. The data management system includes: a session manager routing users to at least one of a plurality of presentation layer servers; an application manager coupling business applications provided by the business application servers responsive to user interaction with the presentation servers; and a data manager coupling business applications to at least one of a plurality of data sets.

32 Claims, 7 Drawing Sheets

U.S. PATENT DOCUMENTS

| | | | |
|---|---|---|---|
| 5,755,072 | A | 5/1998 | Lingafelter |
| 5,758,327 | A | 5/1998 | Gardner et al. |
| 5,758,328 | A | 5/1998 | Giovannoli |
| 5,761,674 | A | 6/1998 | Ito |
| 5,765,142 | A | 6/1998 | Allred et al. |
| 5,768,142 | A | 6/1998 | Jacobs |
| 5,774,668 | A | 6/1998 | Choquier et al. |
| 5,793,632 | A | 8/1998 | Fad et al. |
| 5,799,286 | A | 8/1998 | Morgan et al. |
| 5,799,318 | A | 8/1998 | Cardinal et al. |
| 5,815,829 | A | 9/1998 | Zargar |
| 5,826,252 | A | 10/1998 | Wolters, Jr. et al. |
| 5,842,178 | A | 11/1998 | Giovannoli |
| 5,847,971 | A | 12/1998 | Ladner et al. |
| 5,873,076 | A | 2/1999 | Barr et al. |
| 5,875,110 | A | 2/1999 | Jacobs |
| 5,893,082 | A | 4/1999 | McCormick |
| 5,895,454 | A | 4/1999 | Harrington |
| 5,899,980 | A | 5/1999 | Wilf et al. |
| 5,903,877 | A | 5/1999 | Berkowitz et al. |
| 5,924,094 | A | 7/1999 | Sutter |
| 5,926,798 | A | 7/1999 | Carter |
| 5,931,907 | A | 8/1999 | Davies et al. |
| 5,932,459 | A | 8/1999 | Sittinger et al. |
| 5,946,665 | A | 8/1999 | Suzuki et al. |
| 5,950,173 | A | 9/1999 | Perkowski |
| 5,950,206 | A | 9/1999 | Krause |
| 5,956,709 | A | 9/1999 | Xue |
| 5,970,472 | A | 10/1999 | Allsop et al. |
| 5,970,475 | A | 10/1999 | Barnes et al. |
| 5,970,490 | A | 10/1999 | Morgenstern |
| 5,974,395 | A | 10/1999 | Bellini et al. |
| 5,983,010 | A | 11/1999 | Murdock et al. |
| 5,991,535 | A | 11/1999 | Fowlow et al. |
| 5,999,915 | A | 12/1999 | Nahan et al. |
| 6,002,855 | A | 12/1999 | Ladner et al. |
| 6,009,413 | A | 12/1999 | Webber et al. |
| 6,012,066 | A | 1/2000 | Discount et al. |
| 6,014,644 | A | 1/2000 | Erickson |
| 6,026,376 | A | 2/2000 | Kenney |
| 6,029,174 | A | 2/2000 | Sprenger et al. |
| 6,035,293 | A | 3/2000 | Lantz et al. |
| 6,037,945 | A | 3/2000 | Loveland |
| 6,038,547 | A | 3/2000 | Casto |
| 6,047,290 | A | 4/2000 | Kennedy et al. |
| 6,064,982 | A | 5/2000 | Puri |
| 6,260,021 | B1 * | 7/2001 | Wong et al. ............ 705/2 |
| 6,266,150 | B1 * | 7/2001 | Brossman et al. ........ 358/1.15 |
| 6,279,032 | B1 * | 8/2001 | Short et al. ............ 709/209 |
| 6,363,362 | B1 | 3/2002 | Burfield et al. |
| 6,363,393 | B1 * | 3/2002 | Ribitzky ............ 707/102 |
| 6,377,993 | B1 * | 4/2002 | Brandt et al. ........ 709/227 |
| 6,611,498 | B1 * | 8/2003 | Baker et al. ........ 370/252 |
| 6,631,402 | B1 * | 10/2003 | Devine et al. ........ 709/217 |
| 6,804,708 | B1 * | 10/2004 | Jerding et al. ........ 709/220 |
| 6,826,541 | B1 * | 11/2004 | Johnston et al. ........ 705/36 R |
| 6,970,935 | B1 * | 11/2005 | Maes ............ 709/230 |
| 7,010,503 | B1 * | 3/2006 | Oliver et al. ........ 705/26 |
| 2001/0034771 | A1 * | 10/2001 | Hutsch et al. ........ 709/217 |

FOREIGN PATENT DOCUMENTS

| | | |
|---|---|---|
| JP | 07271569 A | 10/1995 |
| WO | WO 98 43155 A | 10/1998 |
| WO | WO 99/22332 | 5/1999 |
| WO | WO 01/14987 | 3/2001 |
| WO | WO 01 63449 A | 8/2001 |
| WO | WO 01/67279 A | 9/2001 |

OTHER PUBLICATIONS

Zhao, "Technical Note—WebEntree: A Web Service Aggregator," IBM Systems Journal, vol. 37, No. 4, 1998, pp. 584-595.

Saimi, et al., Presentation Layer Framework of Web Application Systems with Server-side Java Technology, Computer Software and Applications Conference, 2000, Oct. 25, 2000, pp. 473-478.

http://www.fedcenter.com printed May 22, 2000.

http://www.rent.net printed May 22, 2000.

http://www.apartments.com printed May 22, 2000.

http://www.us.buy.com printed May 22, 2000.

http://www.designmanager.com printed Mar. 6, 2002.

Thomas A. Wucherer, "An Architectural Design Program Computer Data Base" Dec. 1987.

Tom Field, "Reengineering the Engineering Business", CIO Magazine Feb. 1, 1998.

P. Kristoff, et al., "The Process Specification System for MMST", IEEE Transactions of Semiconductor Manufacturing, vol. 8, No. 3, Aug. 1995, pp. 262-271.

J. McGee, et al., "The MMST Computer-Integrated Manufacturing System Framework", IEEE Transactions on Semiconductor Manufacturing, vol. 7, No. 2, May 1994, pp. 107-116.

T-K Peng, et al., "A Step Toward STEP-Compatible Engineering Data Management: The Data Models of Product Structure And Engineering Changes", Robotics and Computer Integrat Manufacturing, vol. 14, No. 2, Apr. 1, 1998, pp. 89-109.

Hori, et al., "OpenMES: Scalable Manufacturing Execution Framework Based On Distributed Object Computing", Systems, Man and Cybernetics, 1999, IEEE SMC '99 Conf. Proceedings 1999 IEEE Int'l Conf., Tokyo, Japan, Oct. 12-15, 1999, pp. 398-403.

* cited by examiner

| Company ID | PLL Location | Company BAL Location | Company DAL Location | Message BAL Location | Message DAL Location |
|---|---|---|---|---|---|
| 1 . . . 200 | east.cluster system.com | t3://bal-company1-east.cluster system.net:7010 | east-company1-dal | t3://bal-message1-east.cluster system.net:7020 | east-message1-dal |
| . . . 801 . . . 1000 | east.cluster system.com | t3://bal-company5-east.cluster system.net:7010 | east-company2-dal | t3://bal-message5-east.cluster system.net:7020 | east-message2-dal |
| 1001 . . . 1200 | west.cluster system.com | t3://bal-company1-west.cluster system.net:7010 | west-company2-dal | t3://bal-message1-west.cluster system.net:7020 | west-message1-dal |
| . 1801 . . . 2000 | west.cluster system.com | t3://bal-company1-west.cluster system.net:7010 | west-company2-dal | t3://bal-message5-west.cluster system.net:7020 | west-message2-dal |

Figure 8

| Property ID | PLL Location | BAL Location | DAL Location |
|---|---|---|---|
| 1<br>.<br>.<br>.<br>200 | east.clustersystem.com | t3://bal-project1-east.clustersystem.net:7030 | east- project1-dal |
| .<br>.<br>.<br>9801<br>.<br>.<br>.<br>10000 | east.clustersystem.com | t3://bal-project 50-east.clustersystem.net:7030 | east- project20-dal |
| 10001<br>.<br>.<br>.<br>10200 | west.clustersystem.com | t3://bal-project 1-west.clustersystem.net:7030 | west- project1-dal |
| .<br>.<br>.<br>19801<br>.<br>.<br>.<br>20000 | west.clustersystem.com | t3://bal-project 50-west.clustersystem.net:7030 | west-project20-dal |

Figure 9

DATA STORAGE AND ACCESS EMPLOYING CLUSTERING

CLAIM OF PRIORITY

This application claims the benefit of U.S. Provisional Application Ser. No. 60/274,302, entitled "Intelligent Data Storage And Access Employing Central And Local Clusters", filed Mar. 8, 2001.

BACKGROUND OF THE INVENTION

1. Field of the Invention

The present invention is directed to providing a large amount of real time data to applications, and in particular, to providing a system which is both horizontally and vertically scalable to handle large amounts of data and provide such data to applications in real time.

2. Description of the Related Art

The Internet provides individuals with access to information on a scale heretofore unknown. The quantity of such information is also growing at an ever-increasing rate. One consequence of this information explosion is the need to maintain and scale data in a database that is accessible to large numbers of people, and which contains millions if not billions of items. Such large scale database systems with the ability to continue scaling with the exponential growth of the data which they must serve are generally proprietary in nature, developed to maintain, provide and scale based on the particular type of information they are designed to serve. For example, large database stores such as the World Wide Web searchable information guide Yahoo!® are built with proprietary technology. In such cases, the data is static for a period of time and designed to be read only, in order to provide fast access to users.

Figure 1:
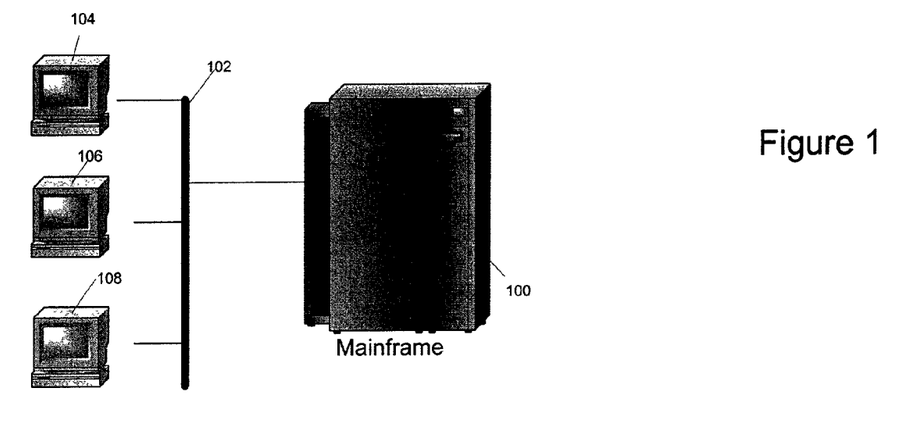
FIG. 1 is a block diagram representing a prior art mainframe system coupled via a local area network to a plurality of dumb terminals.

Historically, data was provided on mainframe systems such as those shown in FIG. 1. FIG. 1 shows a mainframe computer 100 coupled via a local area network 102 to a plurality of dumb terminals 104-108. Mainframe systems were the dominant data access and processing systems until the early 1990s. Typical mainframe systems supported approximately one thousand users via CRT monitors. All of the presentation, business logic and data storage generally occurred on one piece of hardware, often referred to as a central processing unit (CPU). Users operated a dumb terminal 104 (a CRT monitor and keyboard) that could only display data provided by the CPU or entered via the keyboard. Access to the CPU via the dumb terminals occurred through very localized LANs 102 and data transfer protocols. Application code for the CPU to execute was difficult to write or change, and implementation was limited.

Figure 2:
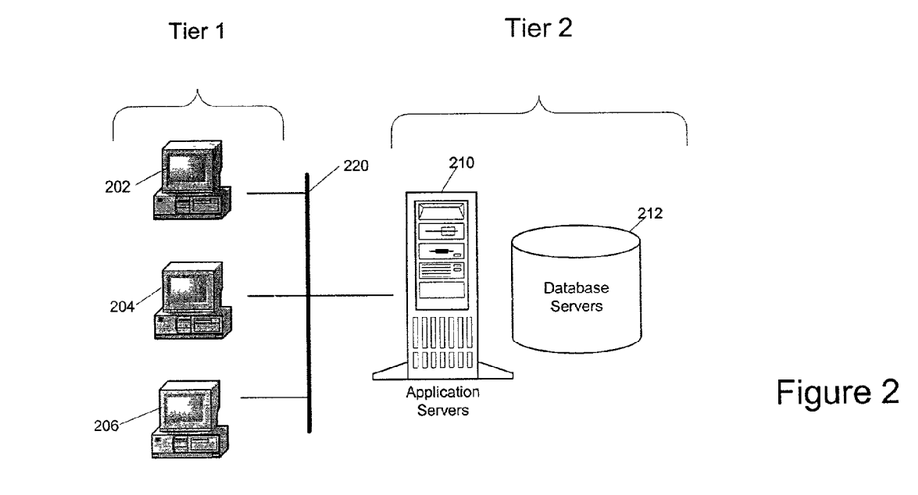
FIG. 2 is a block diagram representing a two tiered data and application delivery system.

FIG. 2 shows the next layer in data provision, that of client server systems. Client Server systems replaced Mainframe systems as the primary means for distributed data processing in the early 90's and remained dominant until around 1997. Thousands of users could be supported by operating a personal computer (PC) 202–206 in a first tier, tier 1, where business logic and presentation occurred. The PCs 202–206 accessed data application and server 210, 212 via a local or wide area network 220. Client Server systems are problematic since PCs were easily overloaded by software applications, and software application updates required individual downloading via diskette or from the web. Tier 2 consisted mainly of mainframes and high end UNIX machines.

The Internet forced users to move toward browser-based systems and away from client server systems as the primary means of distributed data storage and processing. The most common current browser based system is a three-tier architecture system shown in FIG. 3. This technology can support several thousands of users on multiple sites. In the first tier, individual appliances (PCs, Internet appliances, and the like) use browser based technology such as HTML, JSP etc. The second tier relates to the web server that delivers static pages to users on the internet and the application servers that actually process data (the business logic level). The third tier contains the database management system that stores the data that tier 2 requires (the backend).

Figure 3:
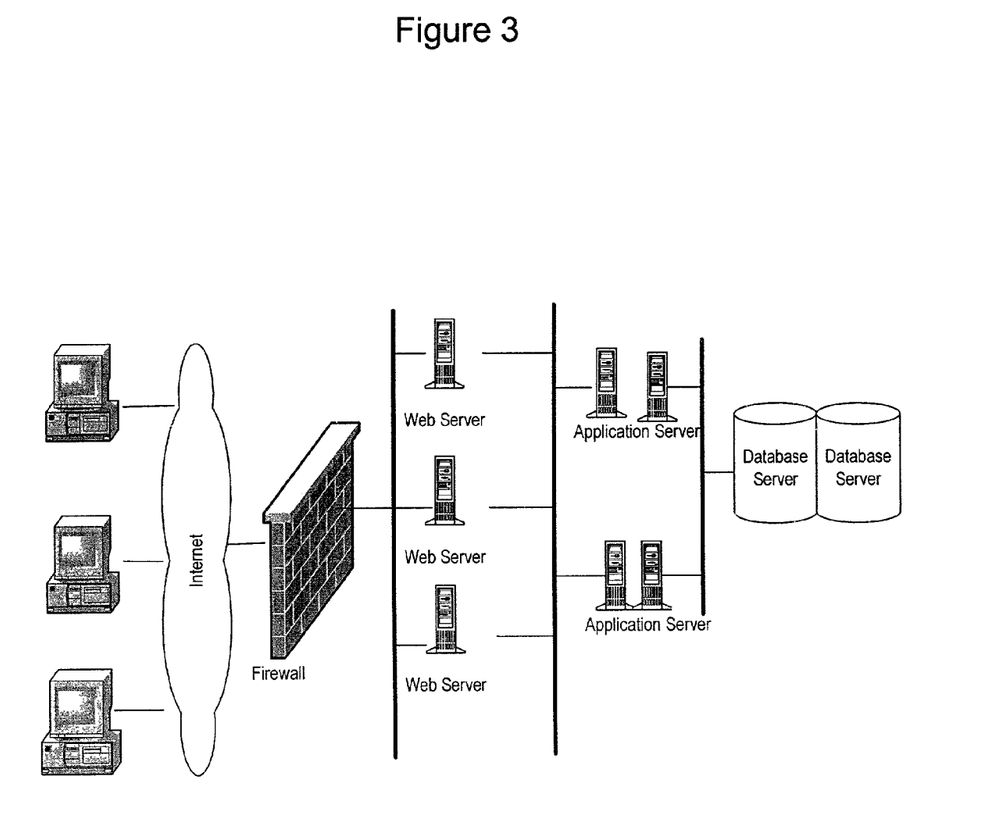
FIG. 3 is a block diagram of a three tier system of the prior art.

This three-tier system provides a distributed processing model that allows updates to occur immediately and has more flexibility and scalability than client/server systems.

Some believe that the explosive growth of information is just beginning. Businesses, service providers and governments will need to manage tremendous amounts of information in an effective manner, and not all agencies will have the ability or the resources to command proprietary database structures to enable such database management. For organizations where such data is a key aspect of business growth, the implications are profound. While systems such as Networked Attached Storing (NAS) and Storage Area Networks (SANS) offer some performance and scalability, each as drawbacks. NAS based applications are bandwidth limited, so that when the database or network access pipe reaches some upper limit, data access becomes problematic. SANS generally lack the file sharing capabilities of NAS systems.

Businesses such as electronic retailers, web service providers with dynamic content and electronic retailing businesses will all feel the effects of these problems. A data intensive system which may be operated via the Internet is the system disclosed in: co-pending U.S. patent application Ser. No. 10/021,661 filed on Oct. 30, 2001, entitled "Intelligent Object Builder" and naming Thomas A. Wucherer, Cherisse M. Nicastro, Anthony A. Marnell II and Anthony A. Marnell III as inventors, the application being incorporated herein by reference in its entirety; co-pending U.S. patent application Ser. No. 10/015,903 filed on Oct. 30, 2001, entitled "Item Specification Object Management System" and naming Cherisse M. Nicastro, Thomas A. Wucherer, Todd Nisbet, Anthony A. Marnell II, and Anthony A. Marnell III as inventors, the application being incorporated herein by reference in its entirety; and co-pending U.S. patent application Ser. No. 10/016,615 filed on Oct. 30, 2001, entitled "Business Asset Management System Using Virtual Areas" and naming Cherisse M. Nicastro, Thomas A. Wucherer, Todd Nisbet, Anthony A. Marnell II, Anthony A. Marnell III, and Herman Spencer Jr. as inventors, the application being incorporated herein by reference in its entirety.

The foregoing applications disclose an Intelligent Business System for use, for example, in the design and build of a large or complicated building construction project. The system described therein presents a complete design—build—management solution to the tasks involved in overseeing and managing construction, manufacturing, and maintaining assets such as buildings, ships, airplanes and the like. In one aspect, the system is an enterprise system, Application Service Provider (ASP) platform, and open architecture system which provides application toolsets that allow: multiple participants to collaborate on projects; automation of bidding and estimating processes; accuracy and efficiency in purchasing; integration with existing applications; and simple but secure access over the Internet or a private network. The system captures and manages information throughout the design, build, and manage phases of the resulting asset.

All data is available in real-time providing consistent information throughout a project's lifecycle. Even after an asset has been built, an owner or property manager can access the system to derive specific information within a few seconds. This system can be applied to any number of design and build industries, including: Hospitality, Civil and Electrical Infrastructure; Telecom; Commercial, Residential, and Government Buildings; Manufacturing; Aerospace and Nautical applications; and Automobile, Railways, and Public Transportation projects.

The system provides this solution to users in real time, so that all information modified by users is instantly available to other users in the system, creating even greater efficiency.

The foregoing system tracks a multitude of data with respect to the project being managed. A brief summary of such data and its characteristics is set forth as follows:

Attribute: A quality of characteristic inherent in or ascribed to an item specification.

Business Object: An article used in the conducting of business, such as a schedule of items, a letter, an email, a purchase order, a request for quotation, and the like.

Classification: The system of the present invention recognizes classifications as a category or class of item types. The classification tree displays the classes in a hierarchal fashion.

Company: An organization or group that performs services or provides products within the system. A business enterprise; a firm. Individual company defaults and standards in the Intelligent Business System revolve around a company.

Component: The system supports components as a part of an Item Specification. A component is an existing Item Specification associated to another item specification; together, they make up a whole item or an assembly. An Item Specification can have multiple components.

Document Set: A special type of folder in the Collaboration tool. A document set allows a user to group together any number of files into a common set. The actual files are stored in separate folders organized in whatever manner suits the user. The contents of the document set folder are merely shortcuts, or pointers, to the actual files. Only one copy of any given file needs to be maintained.

Item Specification: The detail information about objects involved in building the parts and components of something. An example of an item would be a desk; an example of the item specification would be the description of the desk (height, width, depth, color, material, and so forth), its manufacturer(s), costs, delivery options, catalog numbers, and so forth.

Item Type: A template for creating item specifications for broad categories of items. For example: a user might have an item type of "office furniture," this item type forms a template a user would use to create the many item specifications for various desks required.

Project: A plan or proposal; a scheme or undertaking requiring concerted effort. The system of the present invention allows any plan with more than one task to be considered as a project.

Project Partners: Project Partners can include suppliers, vendors, contractors, designers, and consultants who have different levels of access to specifications and receive information about, and respond to information on, the Property or Project.

Property: The base organizational point for the activities of a Company within the present system. The property is the largest hierarchal space in one or more virtual areas. The "Property" label may be customized using the Nomenclature options in Company Defaults.

Schedule: A schedule is a list of specified items, a reference number, a version number and the item status information. The system provides the ability to generate schedules, either by type or instance, for the entire project or specific virtual areas.

Thus, for example, the system disclosed in co-pending U.S. patent application Ser. Nos. 10/021,661, 10/015,903, and 10/016,615 tracks every aspect and every instance of an item in a project being managed. For example, the system tracks not just every type of lightbulb used in a hotel construction, but every instance of a particular type of lightbulb used in the construction of the hotel.

In providing the foregoing Intelligent Business System, as with many large scale data problems, the solution provider would generally be required to go to a proprietary database system to provide a solution to tracking the sheer volume of data in multiple projects. However, it would be advantageous to provide a system whereby the system administrator of such a system could use "off-the-shelf" database technology and hardware in building a system that could manage the data used by such a system. Ideally, such a solution would be able to scale to theoretically infinite levels of data without loss of performance.

SUMMARY OF THE INVENTION

The invention, roughly described, comprises a scalable data delivery system including a plurality of application servers, web servers and data servers. In one aspect, the invention includes a session manager directing users accessing the system to a subset of said web servers, application servers and data servers based on a characteristic of said users. The system includes an application manager coupling applications from the application servers to users via said web servers. In addition, a data manager coupling applications from the application servers to data in the data servers may be provided.

In a further aspect of the invention, the application servers and data servers are partitioned into sets based on at least one data characteristic, and ones of said application servers partitioned on a first characteristic are associated with data servers partitioned on said first characteristic.

In another embodiment, the invention comprises a data management system operable between a set of presentation layer servers, a set of application servers and a set of data servers. The data management system includes: a session manager routing users to at least one of a plurality of presentation layer servers; an application manager coupling business applications provided by the business application servers responsive to user interaction with the presentation servers; and a data manager coupling business applications to at least one of a plurality of data sets.

In a further aspect, the plurality of presentation layer servers comprise at least two clusters of presentation servers partitioned by a company identifier. In addition, the plurality of application servers may comprise at least two clusters of application servers partitioned by a data type.

In a further unique aspect, the session manager is configurable to allow routing to multiple sets of said presentation, application and data servers.

In yet another embodiment, the invention comprises a method for scaling data and processing power. The method may comprise the steps of: providing business applications and application data accessible to users; segregating the business applications into application sets, and data into data sets, based on at least one characteristic of the application data; receiving requests from users via said business applications for access to data in the set; directing said user requests to an appropriate application set based on a characteristic of the user; and directing applications in said appropriate application set to at least one data set based on said user request.

In a further aspect, the method may include an additional step of providing a presentation logic layer receiving requests for business applications and data.

In another aspect, the invention comprises a method for responding to a user request for a business application in a web page. In this embodiment, the method includes the steps of: displaying, responsive to the user request, a business application access page output from a presentation server cluster, the access page providing a user with access to a business application; providing one of a plurality of business application programs to a user device responsive to the request from the user, the program being provided from one of a plurality of business application servers partitioned based on a characteristic of data used by the business applications; and providing data to the business application program on the user device from one of a plurality of data application servers partitioned based on said characteristic of said data.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

The present invention comprises a platform designed to scale in data handling capability both horizontally and vertically. As used herein, vertical scaling refers to a scaling of the effective amount of data the system can handle, while horizontal scaling refers to the addition of additional hardware to the system in order to handle the data processing requirements of the system.

The system of the present invention comprises a Clustering System for data storage and data processing. The system includes a hardware or vertical scaling component and a horizontal or data scaling component. The Clustering System of the present invention surpasses the data handling capability of the three tier browser based system and can support millions of users through multiple sites. In a unique advantage of the present invention, commercial components are used to effectively scale to much greater sizes than such components were originally designed.

Generally, a central or system administrator based system contains data on all users of the system. When users enter the Clustering System through a login screen they are operating in the central cluster. As the user selects, for example, data representing a completed construction property such as a hotel or a property under construction, the users are pushed to one of a number of local clusters. This means that after the initial login each cluster only has to deal with a sub-set of users of the entire Clustering System.

Redundancy is built into the system by mirroring each server and having backup in case of failure. If one of the clusters were lost then the users would be pushed to another cluster. The Clustering System offers high contingency and scalability through its partitioned architecture.

In a further aspect of the system, a data partitioning model is utilized that splits up data so that no one piece of hardware is overloaded. When used with the Intelligent Business System described in co-pending U.S. patent application Ser. Nos. 10/021,661, 10/015,903, and 10/016,615, for example, each property may be given its own data server so that the efficiency of the storage component is increased. For example, a system could contain billions of documents (such as purchase orders (POs) and bids) but through data partitioning, the information is split up by property to avoid searching through endless tables of non-related entries.

Figure 4:
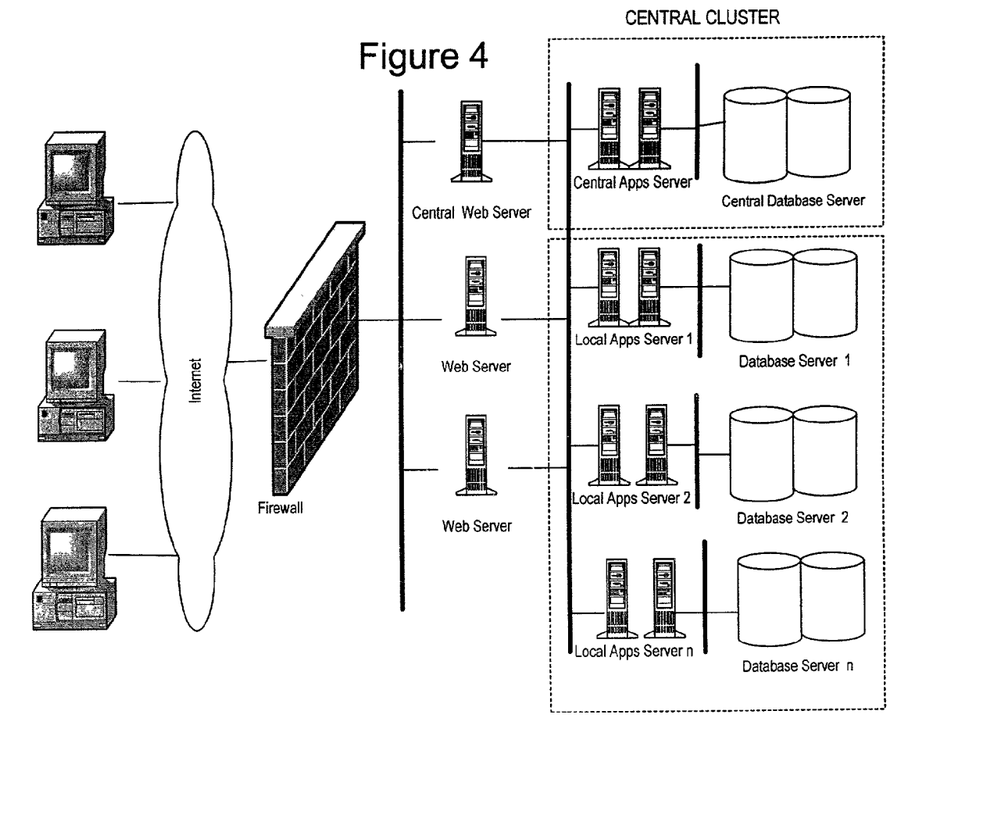
FIG. 4 is a block diagram of a conceptional representation of the system of the present invention.

A general representation of the system of the present invention is shown in FIG. 4. As shown therein, the central database server contains various sub-databases that span a number of properties and projects. As the user enters the application, they are operating within the central database, which is where all of the functionality in the first screen is performed. Such as:

Company defaults and company profile wizard;
Login and customer access checks and validation;
Project and property association; and
The user's message center.

To ensure dependability and eliminate single points of failure, each server is mirrored so that data and information can never be lost.

This means that everything that is stored in the database server is replicated on a second piece of hardware.

The Clustering System can be operated on an Application Service Provider level, with a number of clusters using a number of properties and companies, and at a local cluster level. Each local database server contains a number of property containers. As the user selects the property and project that they wish to work on, they are pushed to a local server. Every property that is created is given its own container or data server. These containers are stored locally according to a percentage usage or other load balancing model. As the hardware server's capacity is reached, the next property that is created will be pushed to the next available cluster. A "next available cluster" is determined by an algorithm that looks at a target number of properties per schema table and updates the property count in this table every time a new property is created. When the target count is reached, the active schema is flagged as full and the next available schema in the list is then flagged as "active", the target count is set to the default target count and the number of properties is set to one. This can be overridden to allow for a particular schema to have just one property. The algorithm also takes the creator's company in to account.

The containers store all of the specific data relevant is designed to accomplish three objectives. First, the invention is designed as a platform for maximum scalability in an open, non-proprietary architecture. Second, the invention provides a mechanism for transparent data separation within the Application Service Provider (ASP) model for enhanced security. Third, the invention creates distribution and management services that facilitate extreme distribution of a software solution to the degree that it can be installed and managed behind a client's firewall.

In accordance with the foregoing objectives, when considering maximum scalability, one must consider horizontal scaling as well as vertical scaling. The horizontal scaling aspect is the philosophy of providing for scaling by adding computer hardware and servers to clusters. Horizontal scaling is absolutely required but can only take a non-proprietary architecture so far. At some point in a large application, especially if the application is designed to support hundreds, thousands or even hundreds of thousands of companies, such as the application set forth in co-pending U.S. patent application Ser. Nos. 10/021,661, 10/015,903, and 10/016,615, data will become the bottleneck. The vertical scaling aspect addresses the handling of the unlimited growth of data. The system of the present invention uses tiers of layers of application functionality combined with management applications, in one aspect running as services on a processing system, to achieve a seamless horizontal scaling by facilitating the adding of computers to clusters and clusters to cluster sets. In one aspect, such services include a Session Manager service and Bean Manager service, where the Session Manager and the Bean Manager are java enabled programs running on dedicated or shared servers coupled as described herein.

Using this approach allows the Clustering System to add as much computer horsepower as required without changing any software or interrupting service in any way. The Clustering System of the present invention uses the Data Manager and an "identical schema" approach to facilitate vertical scaling.

As noted above, another object of the invention is to provide a mechanism for transparent data separation within the Application Service Provider (ASP) model for enhanced security.

The system facilitates isolation and separation of client hardware and software services and data through the use of a Session Manager, and a Data Manager. These elements, in conjunction with other elements of the system of the present invention, direct specific users, such as customers, to specific clusters handling data for those users, and manage the load attributed to those clusters to facilitate system performance.

Also, as noted above, yet another object of the invention is to provide distribution and management services that facilitate extreme distribution of software solutions which can be installed and managed behind a client's firewall.

The Clustering System solution that facilitates "transparent data separation" also facilitates extreme distribution. The Session Manager service is capable of directing a user to a Presentation Logic Layer application which is located behind a client's firewall, if the client is Internet accessible.

Definitions

The following terminology is used herein for convenience in understanding the present invention. It should be understood that the following definitions are not intended as limiting the scope of the present invention to the particular terms which are defined. Other nomenclature may be used to represent the concepts and substance of the concepts reflected in the definitions.

As used herein, the term "cluster" comprises a group of servers and other resources that act like a single system and enable high availability. In some cases, clusters also enable load balancing and parallel processing. One of the main ideas of clustering is that, to the outside world, the cluster appears to be a single system. A common use of clustering is to load balance traffic on high-traffic Web sites. A Web page request is sent to a "manager" server, which then determines which of several identical or very similar Web servers to forward the request to for handling.

As used in the present application, the term "cluster" can be further defined to mean a set of servers (computer hardware and software) running in a coordinated and controlled group. A cluster has a single server that manages the resources of the group and designates back-up servers for the purpose of data redundancy to handle automatic fail over in the event of a server crashing while executing requests on behalf of clients. The controller server also handles the initial assignment of requests to servers based on the amount of work each server has pending and the capacity of the server to do that work. All members of a cluster are capable of becoming the controller and they check frequently to insure that the controller itself has not crashed. In such an event, each of the remaining members will vote to see which will become the next controller.

As used in the present document, the term "cookie" refers to a piece of information generated by a Web server and stored in the user's computer, ready for future access. Cookies are embedded in the HTML information flowing back and forth between the user's computer and the Web server.

As used herein, the term "replication" is the process of keeping two different databases synchronized. It is normally used in long distance fail-over strategies. In the event that a disaster were to occur and an entire site where the primary computer systems were running were lost, a replicated site, including the replicated databases, would take over the duties of the primary computers with minimum loss of data or time to users.

There are two basic replication strategies, master-slave and master-master. Master-slave is the easiest to design and implement because one database does all of the work and simply reports results to the slave database on some designated timing interval. In the event that the master dies, the slave takes over. The problem with the master-slave model is that the slave is idle until it is promoted to become the master. This model leaves half of the computer resources unused at all times. The master-master model is designed to address the unused resource problem. In the master-master model, both computer systems and both databases are working for users at the same time. In the event that a disaster were to occur, the remaining system would take over the entire load of the combined systems. The system would run at a slower speed until more resources could be added to the remaining system or until the failed system had recovered. The problem with the master-master model is complexity.

The master-master replication strategy is an order of magnitude more difficult to design and implement. Architects must create their own conflict resolution mechanisms as well as their own work delegation techniques. Because the data exists in two different computer systems at the same time and users can access each of the two systems at the same time, there is nothing stopping two different users from changing the same piece of data or worse yet some related, nested data. If the changes cause a business logic violation, that either system would have stopped if both actions where attempted in one system, both systems must reconcile the data and inform the affected users. This event would not even be detected until the systems attempted to push their changes to the other system, in which case the replication would have failed because the changes were considered a violation of business logic. The failure would leave both systems out of sync and could cause data instabilities in other parts of the system until the problems are found and corrected. If the synchronization timing were set for minutes, as opposed to seconds, the affected users may not even be on the system when the failure occurs.

As used herein the term "schema" refers to the organization or structure for a database. A schema is a database context that defines table definitions as well as all other data definition language (DDL) objects. Users are associated with schemas yet are generally unaware of the schemas existence. Schemas provide the outer most security realm for the database; users actually sign-in to schemas when they think that they are signing-in to the database itself. All databases come with a default schema and additional schemas are not created unless there is a heavy security requirement or if there is a large database and parts of the data lend themselves to server separation. In a large enterprise resource planning (ERP) installation, architects may put the purchasing module and all related database objects into its own schema. The users who need access to the purchasing module would have access to the purchasing module but non-purchasing personnel would not.

As used herein, the term "server" refers to a specific software component that handles requests from different requesters or clients for services that the server is specifically designed to perform. Often a server is running on a dedicated computer hardware, in which case the combined hardware and software together is referred to as "the server".

A "server" may also be considered a computer program that provides services to other computer programs in the same or other computers. In the client/server programming model, a server is a program that awaits and fulfills requests from client programs in the same or other computers. A given application in a computer may function as a client with requests for services from other programs and also as a server of requests from other programs. Specific to the Web, a Web server is the computer program (housed in a computer) that serves requested HTML pages or files. A Web client is the requesting program associated with the user. The Web browser in one's computer is a client that requests HTML files from Web servers.

A "URL" (Uniform Resource Locator) is the address of a file (resource) accessible on the Internet. The type of resource depends on the Internet application protocol. Here is the example: Using the World Wide Web's protocol, the Hypertext Transfer Protocol (HTTP), the resource can be an HTML page, an image file, a program such as a common gateway interface application or Java applet, or any other file supported by HTTP. The URL contains the name of the protocol required to access the resource, a domain name that identifies a specific computer on the Internet, and a hierarchical description of a file location on the computer.

It should be noted that the use of specific URLs in this application is for descriptive purposes only, and no intent is made to direct the user to any specific URL herein as representing a portion of the invention.

Enterprise JavaBeans (Enterprise JavaBean) is an architecture for setting up program components, written in the Java programming language, that run in the server parts of a computer network that uses the client/server model. Enterprise JavaBeans is built on the JavaBeans technology for distributing program components (called Beans) to clients in a network. Enterprise JavaBeans offer enterprises the advantage of being able to control change at the server rather than having to update each individual computer with a client whenever a new program component is changed or added. Enterprise JavaBean components have the advantage of being reusable in multiple applications. To deploy an Enterprise JavaBean or component, it must be part of a specific application, which is called a container.

Enterprise JavaBean's program components are generally known as servlets. The application or container that runs the servlets is sometimes called an application server. In Enterprise JavaBeans, there are two types of beans: session beans and entity beans. An entity bean is described as one that, unlike a session bean, has persistence and can retain its original behavior or state.

System Architecture

Figure 5:
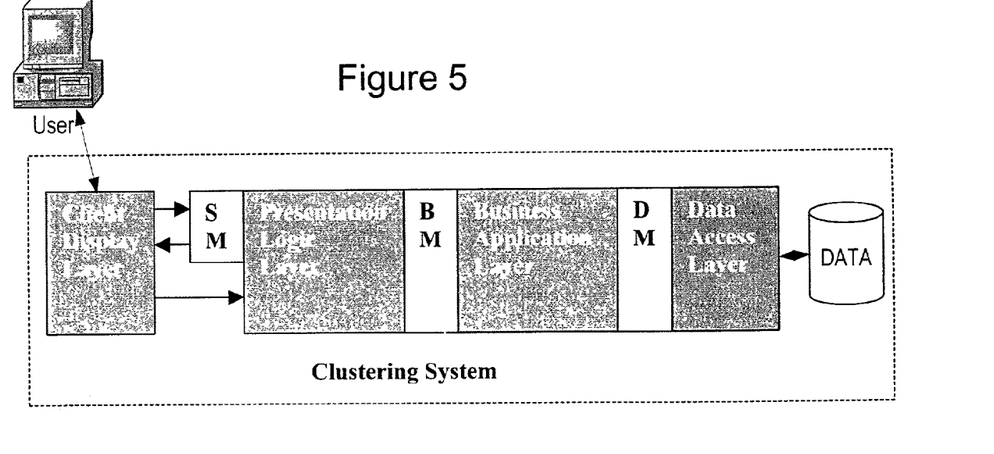
FIG. 5 is a block diagram of the system architecture of the present invention.

FIG. 5 shows a basic overview of the clustering architecture of the present invention. As shown in FIG. 5, the architecture of the present invention is a constructed series of layers and services.

It should be generally understood that the system of the present invention may be supplied and/or operated by a System Administrator. The Administrator may host the application databases, and provide assistance to users of the system at all levels in using the application. In this embodiment, the System Administrator enables Internet access to the system via the Client Display Layer, described below. The Administrator may offer access to the application server, store data and customer service as a service for which the System Administrator collects a fee. Alternatively, the System Administrator may provide the architecture of the present invention to a customer as a stand alone system, or a system which is integrated with other customer systems or the System Administrator's organization. The System Administrator may be an individual, corporation, or any entity charged with the functional and operational control described herein.

The outermost layer of the architecture is the Client Display Layer. The system architecture may generally comprise a mechanism for presenting data in a data store coupled to a data access layer to one or more application servers. In this embodiment, the system architecture is suitable for use with the Intelligent Business System of co-pending U.S. patent application Ser. Nos. 10/021,661, 10/015,903, and 10/016,615. It should be recognized, however, that the principles of scaling the data capacity and processing capability of the present invention are not limited to use with the Intelligent Business System, but could be applied to any application requiring large scaling of processing and data access using existing technology, where a proprietary solution to a Very Large Scale Database is normally required and is cost prohibitive. While there is no official or standard definition for the term Very Large Database (VLDB), it is sometimes used to describe databases occupying magnetic storage in the terabyte range and containing billions of table rows. Typically, these are decision support systems or transaction processing applications serving large numbers of users.

An Internet browser controls the Client Display Layer. Its primary function is to render HTML and Java Applets, as well as provide for client side application validation through java script. The Client Display Layer does not know about server side validation or user application navigation, it always receives instructions through a request object of the HTML string, and always posts requests to the same destination, a system dispatcher. The system dispatcher is a component of the presentation layer which calls the Session Manager responsive to requests from a user's browser. The Client Display Layer is naturally distributed, as there is one for each client, and is unclustered; if a Client Display Layer fails, the user would have to login to the Clustering System again. When a user first accesses the Clustering System during a work session, the request is handled by a Session Manager service (Session Manager).

The Session Manager determines which Presentation Logic Layer the user should be assigned to and returns the proper context back to the Client Display Layer for use throughout the remainder of the session. The Session Manager could direct the user to a specific Presentation Logic Layer cluster based on load balancing, it could direct the user to a customer specific Presentation Logic Layer, or it could direct the user to a different Clustering System enabled site. A Clustering System enabled site may be another data center run by the System Administrator in accordance with the present invention, or a customer location running the system behind a firewall that allows the system to be Internet accessible under correct conditions.

In the embodiment of the Clustering System enabling security of the Intelligent Business System as set forth in co-pending U.S. patent application Ser. Nos. 10/021,661, 10/015,903, and 10/016,615, a series of toolsets is provided to allow users to manage projects via a system of Business Objects. In one embodiment, a Design Toolset, a Procurement Toolset, a Cost Management Toolset, and a Project Teamwork Toolset are provided. Generally, the Design Toolset allows users of the system to input into the system. The Procurement Toolset includes a Bid/RFQ tool and a Purchase tool. The Cost Management Toolset provides a Cost Estimate tool, Budgeting tool, a Contract tool, a Payment tool, and an Invoicing tool. Finally, a Project Teamwork Toolset includes a Collaboration Tool, a Request for Information tool and Meeting Minutes tool which uses messages which must be distributed and stored on various organizational bases. Two other sets of applications are provided—an administration tool set and a utilities tool set.

In the Intelligent Business System application of the Clustering System, one or more Enterprise Java Beans hosted by the System Administrator or by a local customer's Clustering System may implement each of the Toolsets and the Business Objects.

To improve security, as set forth above, a local client can have dedicated Presentation Logic Layer hardware that the Session Manager would direct the user to upon a request by a specified user. In general, when the user takes an action using an interface presented by the Client Display Layer, the Presentation Logic Layer asks the Enterprise JavaBean Manager for a Business Object, which it would direct to the Presentation Logic Layer to a bean on the customer's own hardware. The Bean Object asks the Data Manager for the correct data, which it would again direct the bean to the customer's own database and hardware.

The Presentation Logic Layer is a server designed to handle all client navigation, server side security checks, error handling, application logging and acts on behalf of the client as a requester to Business Application Layer functionality. The Presentation Logic Layer asks the Bean Manager for handles to specific Business Application Enterprise Java Beans. A handle is an abstraction of a network reference to an Enterprise JavaBean object. A handle is intended to be used as a persistent reference to an Enterprise JavaBean object. The Bean Manager returns a handle to the appropriate Business Application Enterprise JavaBean, taking cluster load balancing and secure client environment configurations into consideration. Each machine in the cluster has a performance-monitoring bean. When the bean lookup function (Bean Manager) is called for the handle to a bean, it checks its performance statistics tables to see if it should trust current data for refresh the performance profile of the bean clusters. If it needs to refresh the statistics, it calls a method on the performance-monitoring beans and ranks the responses for its current performance profile, it then returns the handle to the cluster with the best performance. From that point until it refreshes the profile again, it uses a local predictive algorithm to dole out handles to the clusters. The Presentation Logic Layer runs on a set of clustered hardware. The Session Manager determines which specific cluster a user is assigned to at login. An Application server, which in one embodiment is a Weblogic™ Application Server available from BEA Systems, Inc., San Jose, Calif., automatically handles load balancing within a cluster and the Session Manager load balances clusters themselves.

The Bean Manager Service is a cluster manager and bean load balancing service that locates appropriate Business Application Enterprise JavaBean's and returns their handles to requesting Presentation Logic Layer applications. The Bean Manager is also used by Business Application Enterprise JavaBean's to locate other Business Application Enterprise JavaBean's.

The Business Application Layer is where Intelligent Business System's Business Objects can be run. The business objects are written using Enterprise Java Beans, which are being managed by the Application Server. Business Objects such as Purchase Orders, Specifications and Contracts are written as general servers that wait for and respond to specific requests. Business Objects are responsible for maintaining transactional integrity. That is, in applications such as the Intelligent Business System set forth in co-pending U.S. patent application Ser. Nos. 10/021,661, 10/015,903, and 10/016,615, transactions affecting data in one business object have an effect on other objects and data. A transaction affecting a change in data may occur over several objects and two users operating on related or data which affects the other server must be sure that the integrity of the data is not compromised. Hence, each business object must verify the integrity of the data transaction to related objects in such examples. Business Objects do not know the location of the data that they service. These objects can read, write and modify data that directly correspond to its object type, but it does not have the data location programmed into its code.

Before a Business Object can access data it must first request a handle to data from Data Manager. The data in the Cluster system is partitioned into identical schemas. Each Business Object is capable of interacting with all schemas but can only access a schema to which it has been given a handle by the Data Manager. The Business Application Layer runs on a set of clusters, as does the Presentation Logic Layer.

The Data Manager service is a schema manager. It provides requesting Business Application Enterprise Java Beans with handles to appropriate schemas based on a user's configuration settings. It also assigns new properties and companies to specific schemas for data management. The Data Manager may assign users to existing or new Clustering System schemas or to existing or new customer exclusive schemas. Schema security is management by the Data Manager, Business Application Enterprise Java Beans are never aware of schema user-IDs or passwords.

The Data Access Layer for the Clustering System running the ASP service is the Oracle relational database system available from Oracle Corp., Redwood City, Calif. In the system of the present invention, in accordance with the foregoing objectives, the Oracle system has not been modified nor used in any proprietary manner. The database is open and normalized as would be expected within the context of any specific schema. All stored procedures are written to a single administrative schema and take on the schema context of the calling users. This allows the stored procedures to be written once and used for any and all schemas.

Figure 6:
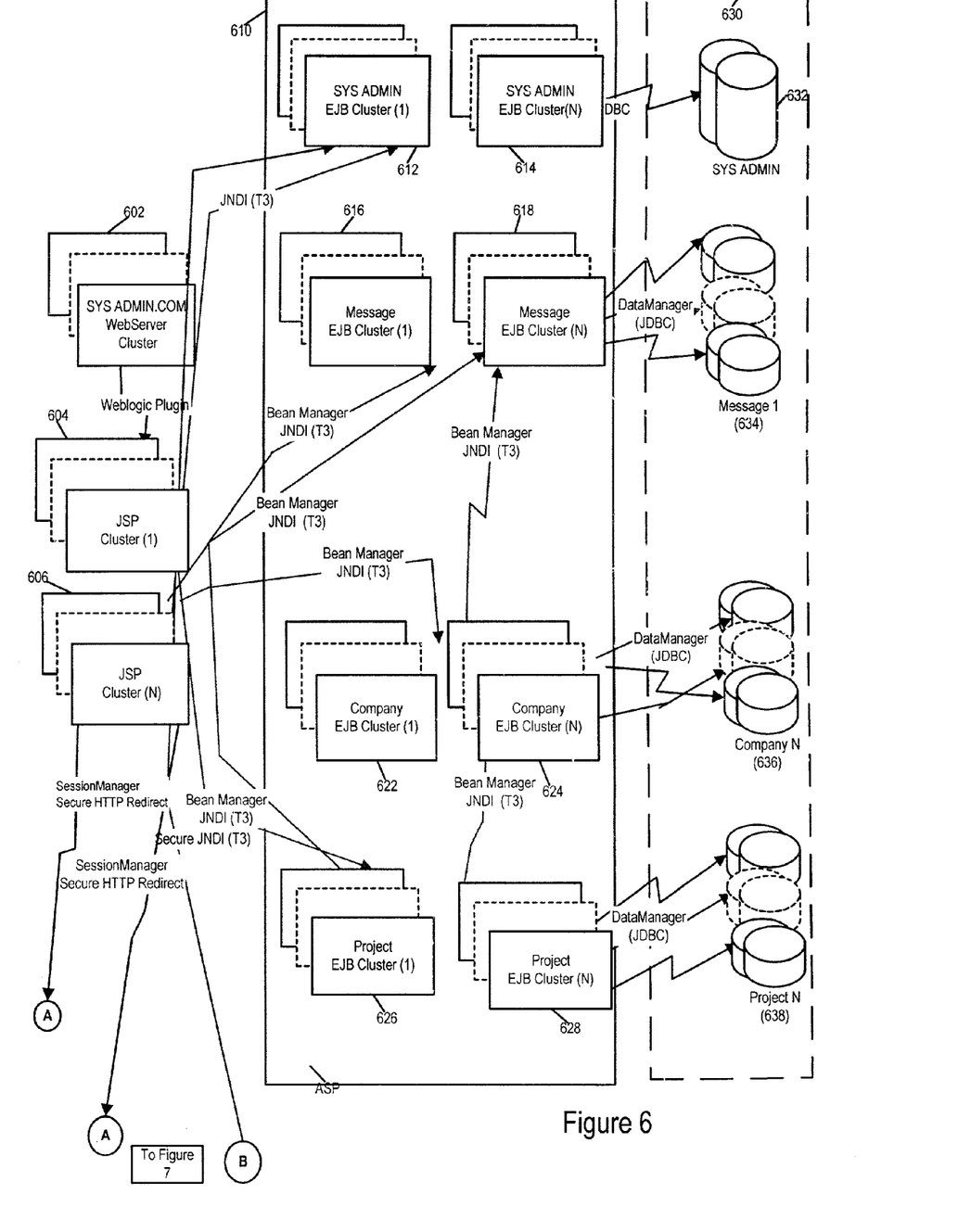
FIG. 6 is a block diagram of the Clustering System of the present invention used by an Application Service Provider.
Figure 7:
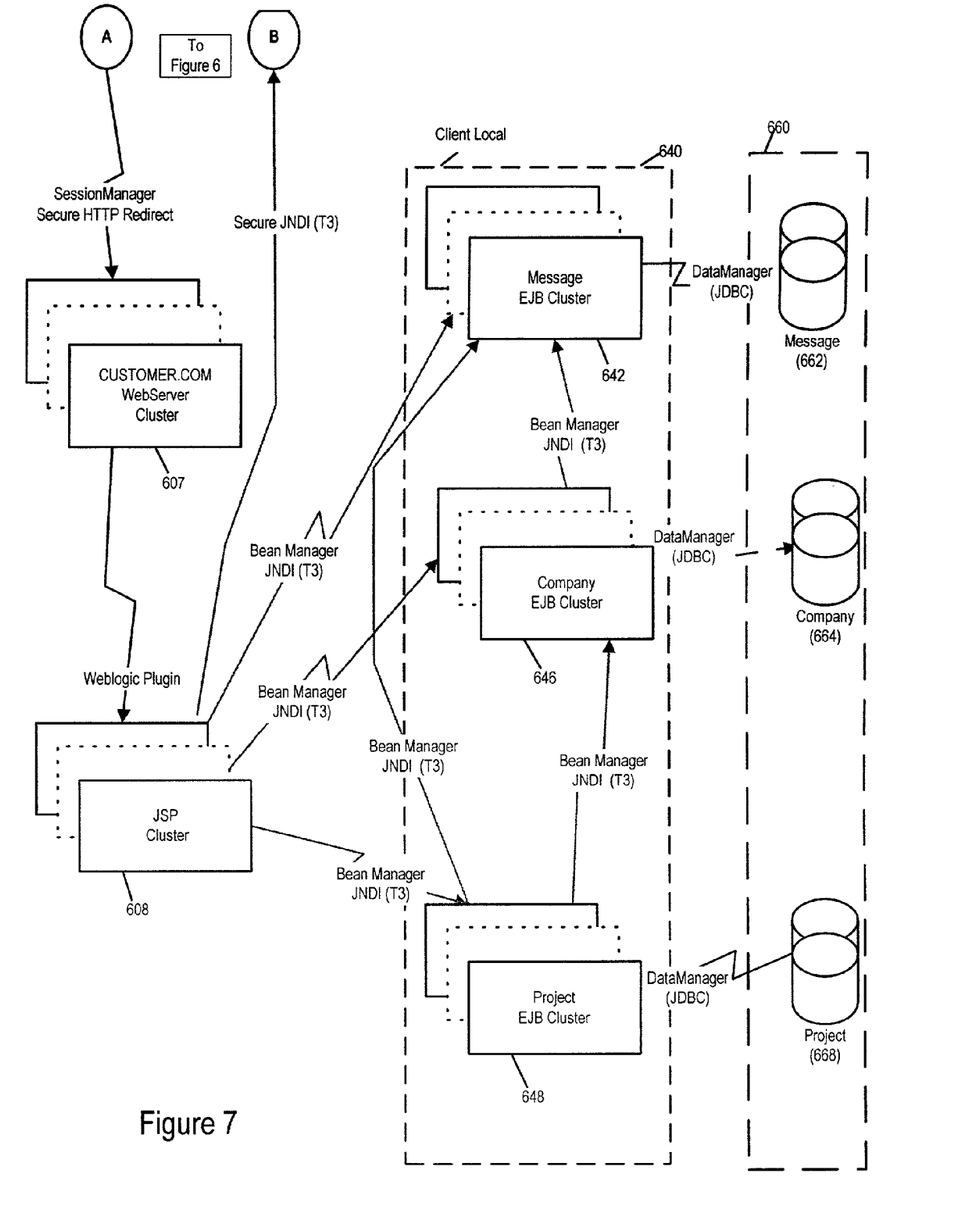
FIG. 7 is a block diagram of the Clustering System of the present invention used by an individual customer in accordance with the present invention.

FIGS. 6 and 7 represent a more detailed embodiment of the Clustering System of the present invention. FIG. 6 shows an environment of the clustering architecture implemented by a System Administrator (sysadmin), while FIG. 7 shows a client environment within a data center run by a System Administrator. It should be recognized that the customer environment could be run at a physical site other than the System Administrator's data center, such as a customer's local data center facility behind a firewall.

FIG. 6 shows the basic architecture of FIG. 5 in additional detail for an ASP embodiment run by a System Administrator. As shown therein, the client display layer includes a web server cluster 602, a number of JSP clusters 604–606. A business application layer plug in, such as the Weblogic™ Application Server plug in, is provided by the web server cluster in order to enable users of the Client Display layer access to the business application layer. A plug in, in this context, refers to a piece of software that allows the web server remember how to consistently route and re-route a client browser back to the correct application server. Given that fact that there are many application servers and a client being re-routed to a wrong server would cause application failure because the state that was cached by the original application server would be unavailable to any other application server (except in the case of a single mirrored clustered machine).

The business application layer 620 includes: from 1 to N administrator Enterprise JavaBean clusters 612, 614; from 1 to N message Enterprise JavaBean clusters; from 1 to N company Enterprise JavaBean clusters; and from 1 to N Project Enterprise JavaBean clusters. The Data Access Layer 630 includes a plurality of sysadmin data stores 632, Message data stores 634, company data stores 636, and project data stores 638.

As shown in FIG. 7, the ASP version of the system may be replicated for a CUSTOMER local system. In the system of FIG. 7, a secure re-direct by the session manager can allow a user accessing the system by reference to the Sysadmin's WebServer cluster 602 to be directed to the customer's web server cluster 607. The customer's web cluster 607 may contain the same information as that which is available to users of the Sysadmin's ASP version of the clustering technology.

As shown in FIG. 7, the CUSTOMER version of the Clustering System need not include the Sysadmin Enterprise JavaBean cluster, as many of the administrative Enterprise JavaBeans may be provided by the System Administrator directly. Moreover, it should be noted that less JSP, Message Enterprise JavaBean, Company Enterprise JavaBean and Project Enterprise JavaBean clusters may be required since the CUSTOMER version of the system is more localized.

In the following description of the invention, it will be recognized that like-named components of the local system shown in FIG. 7 and the ASP version of the system shown in FIG. 6 operate in a similar manner, for different data sets. Hence, their description will not be repeated unless a distinction is required.

The Sysadmin system includes a central webserver cluster 602 which is the central cluster for the Clustering System and includes user logon and password information, along with routing and transaction management information for the Clustering System. The web server cluster 602 presents web-pages to users interacting with the web server cluster via a URL directing them to the web server cluster.

Traffic between the web server cluster and the business application layer is governed according to the JNDI (Java Naming and Directory Interface) which enables Java platform-based applications to access multiple naming and directory services.

Each Clustering System includes centralized System Administrator Clustering system 602 that holds key information for the Clustering System. Central system 602 holds all Clustering System users user ID and password. The central system is the single source of all Clustering System user account and password information and all property/project access information, including users running Clustering System behind their own firewalls. This centralized control allows for routing and security authentications across the Clustering System world, within and outside of client environments. Through data replication, Clustering System is able to support two or more independent data centers. This same technology can be used to help manage and back-up clients running the Clustering System behind their firewalls. The System Administrator Cluster holds base information about all Clustering System users, companies, user licenses and projects. It also holds information for each company and project which Presentation Logic Layer, Business Application Layer and Data Access Layer is serving their requests. All worldwide Clustering System enabled sites access this system to get information for Session Manager to redirect user to appropriate Presentation Logic Layer. Central System 602 may itself comprise clustered hardware, which is replicated for failover support. It should be recognized that each cluster includes a set of clustered server hardware, including at least one server with data replicated from another server using a Mater-Master or Master-Slave approach. Each cluster may comprise LAN or WAN coupled hardware.

Central system 602 may appear to the user as a system login screen and each use of the system will be directed to the Central system before being redirected to an appropriate cluster to interact with application services.

In using the Clustering System with the Business Application System of co-pending U.S. patent application Ser. Nos. 10/021,661, 10/015,903, and 10/016,615, there are two important application events in Clustering System technology to populate base information in Clustering System centralized system: Creating a Company and Creating a Property. In the context of the Clustering System, a Company is a client which may have its own localized version of the Clustering System or be serviced by an ASP version of the system provided by the System Administrator. A Property is a collaborative environment where one or multiple companies/users work.

In the Intelligent Business System Clustering System, when an action calls for creating a company or property, a Business Application layer Enterprise JavaBean asks a specific administrative Bean, AdminEnterprise JavaBean, for a location to create the new object by calling appropriate a create company method.

The method retrieves the company or property data from AData ManagerIN_SCHEMAS and AData ManagerIN_SERVER_SCHEMAS tables. AData ManagerIN_SCHEMAS has information about each schema in the Clustering System, and in particular, the Business Administration Clustering System. (It should be understood that the description of the schemas used herein is specific to the Business Administration System application, but the general principles of schema organization and data distribution have applicability beyond the Business Administration system example of the Clustering System described herein.) The AData ManagerIN_SCHEMAS table has a schema name; a current count of objects (where, for example, if it is company schema then the count is a number of companies it has and if it is project schema then the count is a number of properties it has); a schema type (company, project or message); a max count; and a reserved company ID (which may be used when, for example, a company wants all its properties or messages to be in one schema).

Figure 8:
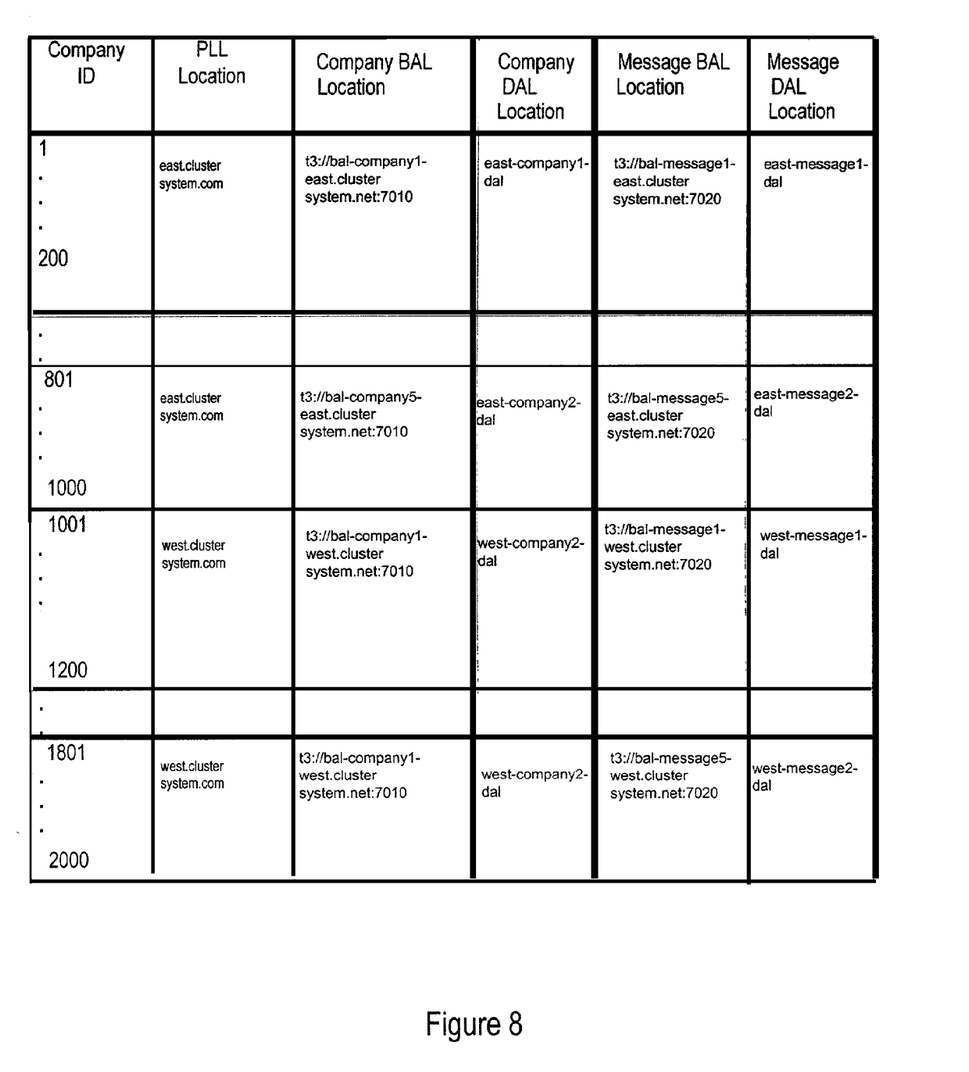
FIG. 8 is a representation of a table in a customer database used in accordance with the present invention.
Figure 9:
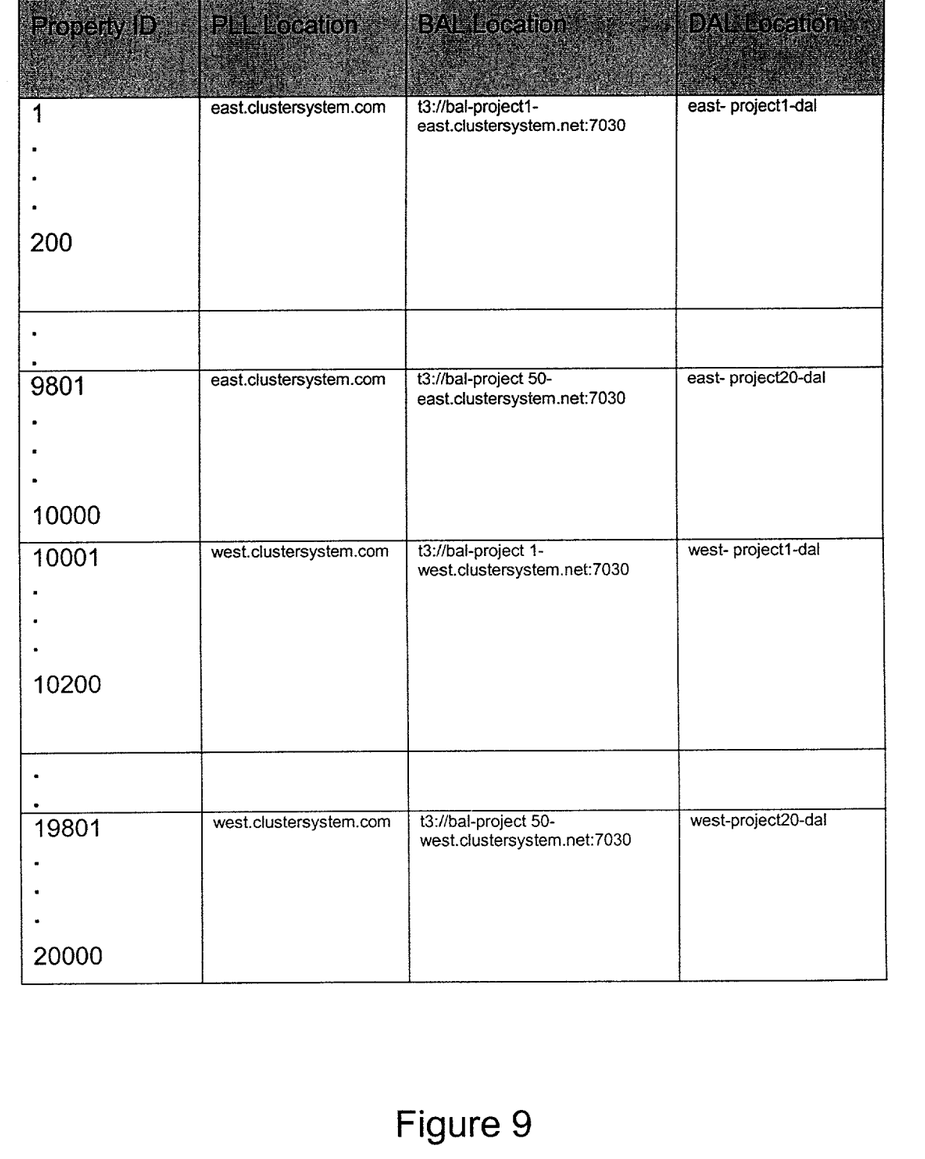
FIG. 9 is a representation of a table in a property database used in accordance with the present invention.

The Create Company method creates and returns URL-Helper object. The URLHelper has information about Presentation Logic Layer, Business Application Layer and Data Access Layer locations. The Create company method saves this information with company ID in company_Info table and it creates the company in correct Data Access (Sample Data.)
Company ID:    1850
Presentation Logic Layer:
    https://west.CLUSTERSYSTEM.com
Company Business Application Layer:    t3://bal-company5-west.CLUSTERSYSTEM.net:7010
Message Business Application Layer:    t3://bal-message5-west.CLUSTERSYSTEM.net:7020
Company Data Access Layer:    east-company1-dal
Message Data Access Layer:    east-message1-dal Create property saves this information with property ID in property_Info table and it creates the property in correct Data Access (Sample Data.)
Property ID: 19850
Presentation Logic Layer:    https://west.CLUSTERSYSTEM.com
Business Application Layer:    t3://bal-project 50-west.System.net:7030
Data Access Layer:    west-project20-dal FIGS. 8 and 9 represent exemplary Company_info and property_info tables, respectively, of the system of the present invention. As shown in FIG. 8, the property info table includes a company ID and for each company, the Presentation Logic Layer location, company Business Application Layer, company Data Access Layer, message Business Application Layer and Message Data Access Layer location. As shown in FIG. 9, the property_info table includes a property ID and for each ID, the Presentation Logic Layer, Business Application Layer and Data Access Layer location.

In one example, a Clustering System has N number of system enabled sites across the world and can be accessed using https://(1 . . . N).clusteringsystem.com URLs. Some sites may be customer specific sites.

Each Clustering System enabled site may have X number of Presentation Logic Layer clusters, Y number of Business Application Layer clusters and Z number of Data Base Schemas. Presentation Logic Layer and Business Application Layer cluster machines may be running Weblogic™ Application Servers. In addition, the Presentation Logic Layer clusters may be running Clustering System JSP, servlet and other Web programs. The Business Application Layer is running Clustering System Business Application-Enterprise JavaBean programs. The Data Access Layer is a group of Oracle Database schemas.

In a unique aspect of the invention, data is partitioned logically by using the schemas to allow more efficient processing of data in the Clustering System. In the Business Administration model, the Business Application Layer and the Data Access Layer are divided into three categories: Messaging, Company and Project.

Messaging Business Application Layer handles all Messaging services such as action items, mail messages, watch list, etc. which are utilized in, for example, the collaboration toolset of the Business Administration system disclosed with respect to co-pending U.S. patent application Ser. Nos. 10/021,661, 10/015,903, and 10/016,615. The Messaging Data Access Layer handles all Messaging related data. Company Business Application Layer and Data Access Layer handle all company services and data like Vendors, Item Types, Item Specs, etc. used in the respective toolsets of the Business Administration System. The Project Business Application Layer and Data Access Layer handle all project services and data like Bids, Item Specs, Purchase Orders, Budget, etc. in the aforementioned Toolsets.

A portion of each layer in Business Application Layer and Data Access Layer is assigned to serve specific set of data. For Company and Message sub layers, a Company ID is the key; for a project sub layer, property ID is the key.

In the example shown in FIGS. 8 and 9, a System Administrator has two Clustering System enabled sites, EAST and WEST. East site serves for company IDs 1 through 1000 and property IDs 1 through 10000. West site serves for company IDs 1001 through 2000 and property IDs 10001 through 20000. They can access by https://east.clustersystem.com and https://west.clustersystem.com through the Internet.

East site has N number of Presentation Logic Layer clusters. Each machine in these clusters is running Weblogic™ application server on a single port which they can access by Presentation Logic Layer1-east.SYSTEM.net:7000 within the firewall. East site web servers transfer all JSP, Servlet and other web requests to these clusters through the Weblogic™ plugin. Presentation Logic Layer clusters load balancing is handled by Weblogic™ plugin in accordance with the standard technology used in the Weblogic™ plugin generally available to one of average skill in the art.

This site has five (5) company and five (5) Messaging Business Application Layer clusters. Each machine in these clusters is running Weblogic™ on a single port. They can access by Business Application LayerCOMPANY1-east-.SYSTEM.net:7010 within the Firewall. Cluster1 serves for 1 through 200 company IDs. Each remaining cluster serves for 200 company IDs.

This site has two (2) company and two (2) Messaging Data Access Layer schemas, these are Oracle database schemas. First Data Access Layer schema serves for company IDs 1 through 500 and the second one serves Ids 500 through 1000.

This site has fifty (50) project Business Application Layer clusters which can access by Business Application Layer-PROJECT1-east.SYSTEM.net:7030. Cluster1 serves for 1 through 200 property IDs. Each remaining cluster serves for 200 property IDs.

This site has twenty (20) PROJECT Data Access Layer schemas. First Data Access Layer schema serves for property IDs 1 through 500 and remaining each Data Access Layer serves for 500 property IDs.

By setting connection pools in Weblogic™ application servers, Business Application Layer clusters have access to Data Access Layer schemas. Connection pools are configured in weblogic.properties file. Each connection pool has a name, database server name, schema name, port number, JDBC driver class name, user ID and password. Business Application Layer access these pools by name.

In one example, if a user from company ID 1850 tries to access property ID 19850 using east.System.com, the session manager, part of whose role is to send users to an appropriate Presentation Logic Layer, will perform user direction. Each Presentation Logic Layer can serve one to many companies. After successful user authentication, the Session Manager takes user's company ID and retrieves the company's Presentation Logic Layer location from AdminEnterprise JavaBean in the Clustering System central cluster 602. AdminEnterprise JavaBean gets the information about Presentation Logic Layer location for a given company ID from company_info table in the Clustering System database. The Session Manager now transfers the user's session and request to appropriate Presentation Logic Layer, and from this point forward, all user's requests go straight to this Presentation Logic Layer.

In this example, the user belongs to company ID 1850. The Session Manager at east site redirects him to west site using Presentation Logic Layer information in company_info table.

Since the Bean Manager role is to serve Enterprise JavaBeans from appropriate Business Application Layer to JSPs in Presentation Logic Layer, when JSP needs a Business Application-Enterprise JavaBean it calls getEnterprise JavaBean (companyId/propertyId) method in Bean Manager. Bean Manager gets Business Application Layer location from AdminEnterprise JavaBean in Clustering System. AdminEnterprise JavaBean gets Business Application Layer information for company from the company info table and for property from property_info table Clustering System database. Next, Bean Manager gets server context from appropriate Business Application Layer and returns the Business Application-Enterprise JavaBean from this Business Application Layer to the Client Display Layer.

In this example, the user belongs to company ID 1850. Next, the Bean Manager at Presentation Logic Layer gets Business Application-Enterprise JavaBeans from Business Application Layer-company5 cluster using Company Business Application Layer information in company_info table. For property requests, the Bean Manager gets Business Application-Enterprise JavaBeans from Business Application Layer-project50 cluster using Business Application Layer information in property_info table.

Finally the Data Manager's role is to serve Data Base Connection from appropriate Data Access Layer to Business Application-Enterprise JavaBeans. When Business Application-Enterprise JavaBean needs Data Base Connection for property, company or message it calls getPropertyConnection(propertyId),getCompanyConnection(companyId) or getMessageConnetion(companyId). Data Manager gets Data Access Layer location from AdminEnterprise JavaBean. AdminEnterprise JavaBean gets property Data Access Layer information from property_info table and company, Message Data Access Layer information from company_info table. Now Data Manager gets the Data Base Connection from appropriate Connection Pool from the Weblogic™ application server.

In this example, the user is accessing company ID 1850. Next, Data Manager at Business Application Layer gets connection to west-company2-dal using Company Data Access Layer information in company_info table. For property requests, the Data Manager gets Connection to west-project-20-dal using Data Access Layer information in property_info table.

In accordance with the foregoing, it will be recognized that clusters can be added to the Clustering System as the need for more data storage and/or processing increases. Additional entries in the property or company table are updated as necessary to handle additional clusters. As a result, the Clustering System can consequently support any number of properties, companies, clients or users.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A scalable data delivery system including a plurality of application servers, presentation servers and data servers, comprising:
   a session manager directing users accessing the system to a subset of said presentation servers, application servers and data servers based on a characteristic of said users;
   an application manager coupling applications from the application servers to users, said act of coupling being responsive to user requests received via said presentation servers associated with the characteristic of said users; and
   a data manager coupling applications from the application servers to data in the data servers based on the characteristic of said users and a data type.

2. The system of claim 1 wherein the presentation servers include a plurality of applet servers, the plurality of applet servers being partitioned based on at least one data characteristic.

3. The system of claim 1 wherein the application servers are partitioned based on at least one data characteristic.

4. The system of claim 3 wherein the data characteristic is an association of the data with a company, a project or a data type.

5. The system of claim 3 wherein the data servers are partitioned based on said at least one data characteristic.

6. The system of claim 1 wherein the application servers and data servers are partitioned into clusters based on at least one data characteristic, such that ones of said application servers partitioned on a first characteristic are associated with data servers partitioned on said first characteristic.

7. The system of claim 1 wherein said application servers are partitioned into clusters based on at least one data characteristic and said application manager manages transactions requiring data from multiple clusters between said application servers.

8. A data management system operable between a set of presentation layer servers, a set of application servers and a set of data servers, comprising:
    a session manager routing users to at least one set of a plurality of presentation layer servers based on a characteristic of said users;
    an application manager coupling business applications provided by the business application servers with applications and users responsive to user interaction with the presentation servers based on said characteristic of said users; and
    a data manager coupling business applications to at least one of a plurality of data sets based on the characteristic of said users and a data type.

9. The management system of claim 8 wherein said plurality of presentation layer servers comprises at least two clusters of presentation servers partitioned by a company identifier.

10. The management system of claim 8 wherein said plurality of application servers comprises at least two clusters of application servers partitioned by the data type.

11. The management system of claim 10 wherein the data type is a company, project or message.

12. The management system of claim 10 wherein the plurality of data sets comprises at least two clusters of data servers, each cluster being partitioned based on the data type.

13. The management system of claim 8 wherein the session manager is configurable to allow routing to multiple sets of said presentation, application and data servers.

14. An Internet application and data delivery system, comprising:
    an administrator data center including:
        a client display cluster,
        an administrative server cluster coupled to the client display cluster and including a user routing facility, said facility including a manager routing users based on a characteristic of users,
        an application server cluster, and
        a data server cluster, said cluster including a data manager routing users based on the characteristic and a data type; and
    a customer data center accessible via the client display cluster responsive to the administrative server cluster, including:
        an application server cluster,
        a presentation server cluster, and
        a data server cluster.

15. The system of claim 14 wherein the customer data center includes a customer client display cluster.

16. The system of claim 14 wherein each said cluster includes at least two servers, at least one of said servers having data replicated from another of said servers.

17. The system of claim 14 wherein the administrative server cluster includes management information directing users to said customer data center.

18. A method for scaling data and processing power, comprising:
    (a) providing business applications and application data accessible to users via first servers where additional second servers may be added to the system while said first servers are in use;
    (b) segregating the business applications into application sets, and data into data sets, based on at least one characteristic of the application data;
    (c) receiving requests from users via said business applications for access to data in one of said data sets;
    (d) directing said user requests to an appropriate application set based on a characteristic of the user associating said user with the application set; and
    (e) directing applications in said appropriate application set to at least one data set based on the characteristic of the user and a data type.

19. The method of claim 18 wherein said step (e) includes directing applications to other applications based on the user request.

20. The method of claim 18 wherein said characteristic of the user is an association of the user with a company or project.

21. The method of claim 18 wherein said characteristic of the data is an association with company project or data type.

22. The method of claim 21 wherein said data type is a message.

23. The method of claim 18 wherein said application sets are provided on a cluster of application servers.

24. The method of claim 18 wherein said data sets are provided on a cluster of application servers.

25. The method of claim 18 further including the step of providing a presentation logic layer receiving requests for business applications and data.

26. The method of claim 25 wherein said step (d) is performed by a business application management service.

27. The method of claim 25 wherein said step (e) is performed by a data manager service.

28. An application delivery system, comprising:
    a user display server;
    a set of user presentation servers segregated to provide presentation services to users based on a characteristic of said user;
    a set of application servers, the application servers providing applications to users, said applications are provided based on a user characteristic and a data type characteristic received via said presentation servers; and
    a set of data servers associated with sub-sets of the application servers, the sub-sets organized by said data type characteristics.

29. A method for responding to a user request for a business application in a web page, comprising:
    displaying, responsive to the user request, a business application access page output from a presentation server cluster, the access page providing a user with access to a business application;
    providing one of a plurality of business application programs to a user device responsive to the request from the user, the program being provided from one of a plurality of business application servers partitioned based on a characteristic of user and data used by the business applications; and
    providing data to the business application program on the user device from one of a plurality of data application servers partitioned based on said user and data characteristic.

30. The method of claim 29 wherein the business application access page includes a servlet capable of calling a business application.

31. The method of claim 30 wherein the business application servers are arranged into at least one of a plurality of server clusters, and each cluster is partitioned based on a data characteristic.

32. The method of claim 31 wherein said data application servers are arranged into one of a plurality of application server clusters and each cluster is partitioned based on a data characteristic.

* * * * *